United States Patent [19]
Bonnafoux

[11] Patent Number: 5,396,629
[45] Date of Patent: Mar. 7, 1995

[54] SYSTEM ARCHITECTURE, AND USE OF THIS ARCHITECTURE IN A METHOD FOR REPLACING BOARDS

[75] Inventor: Jean-Francois Bonnafoux, Lamorlaye, France

[73] Assignee: Bull S. A., Louvecienaes, France

[21] Appl. No.: 661,048

[22] Filed: Feb. 27, 1991

[30] Foreign Application Priority Data

Feb. 28, 1990 [FR] France ................ 90 02517

[51] Int. Cl.⁶ .............................................. G06F 13/22
[52] U.S. Cl. ............................. 364/700; 364/237.2; 364/238.3; 364/264; 364/265; 364/286.2; 364/286.3
[58] Field of Search .......................... 395/700, 650

[56] References Cited

U.S. PATENT DOCUMENTS

| | | | |
|---|---|---|---|
| 4,750,136 | 6/1988 | Arpin et al. | 395/200 |
| 4,803,623 | 2/1989 | Klashka et al. | 395/275 |
| 5,099,485 | 3/1992 | Bruckert et al. | 371/68.3 |
| 5,163,833 | 11/1992 | Olsen et al. | 439/61 |

OTHER PUBLICATIONS

Lewis et al., IEEE "Prototypes from Standard User Interface Management Systems," May 1989, pp. 51-60.
ICL Technical Journal, vol. 6, No. 1, May 1988, pp. 2-16, Oxford, GB, R. Allison, "ICL Series 39 Support Process".
Hewlett-Packard Journal, vol. 38, No. 3, Mar. 1987, pp. 21-28 Palo Alto, US, G. F. Buchanan et al., "A Distributed Terminal Controller for HP Precision Architecture Computers Running the MPE XL Operating System".
IEEE Spectrum, vol. 21, No. 2, Feb. 1984, pp. 36-42, NY, US, T. S. Liu, "Maintenance Processors for Mainframe Computers"
IEEE Transactions On Nuclear Science, vol. 1, 36, No. 1, Feb. 1989, pp. 756-759, NY, US; R. C. Agostini et al. "Pasha-An Approach to Computer-Aided Hardware Debugging".
Computer, "Prototypes from Standard User Interface Management Systems", Lewis et al.; OSU, May 1989, pp. 51-60.

*Primary Examiner*—Kevin A. Kriess
*Assistant Examiner*—John Q. Chavis
*Attorney, Agent, or Firm*—Kerkam, Stowell, Kondracki & Clarke

[57] ABSTRACT

The present invention relates to a system architecture and to the use of this architecture in a method for replacing boards. Architecture enabling remote control of an application, including a first service processor connected via a network and a maintenance unit (40) with channels connected to a central system (4), in which the service processor (1) is connected via a service console switch (30) to a maintenance service console (RMS 6), and to a remote service console (RSC 5). Each service processor and each console further includes operating system programs, a supervisor program, and at least one service broken down into two applications, one called the "body" program, comprising the program algorithm, and the other, the "presentation" program, including an interface with the user enabling a windows-type display with a menu bar.

5 Claims, 17 Drawing Sheets

INTERFACE VMP B-XMESS

| MESSAGE N° | TEXT |
|---|---|
| VSH 001 | MY PREFIXED MESSAGE |
| RPB 120 | "THE REQUESTED SLOT CONTAINS A BOARD" |

INTERFACE XMESS-XMESS

| NAME OF SERVICE | REQUEST | MESSAGE N° | TEXT |
|---|---|---|---|
| SYC 01 | 14.15 | VSH .001 | MY PREFIXED MESSAGE |

MESSAGE RECORDED

| DATE/TIME | NAME OF SERVICE | REQUEST | MESSAGE N° | TEXT |
|---|---|---|---|---|
| 08.01.24 | SYC 01 | 14.15 | VSH 001 | MY...MESSAGE |

FIG.7

SYSTEM ARCHITECTURE, AND USE OF THIS ARCHITECTURE IN A METHOD FOR REPLACING BOARDS

CROSS REFERENCE TO RELATED APPLICATIONS

The invention disclosed and claimed herein is related to the subject matter of the following commonly-assigned patent application Ser. No. 07/852,128, filed Apr. 28, 1992, by Jean-Francios Bonnafoux and Robert Flon, entitled "Architecture for Dynamic Exchange of a Service Processor".

1. Field of the Invention

The present invention relates to a system architecture and the use of this architecture in a method for replacing boards.

2. Background of the Invention

System architectures including service processors and a reserve processor, each of them specific to the system, are known.

It is also known in these systems to perform remote maintenance or downloading or uploading of programs from remote units.

In general, remote maintenance or remotely run programs are done by means having relatively unsophisticated ergonomics and require specific knowledge of the system on the part of the user.

OBJECTS AND SUMMARY OF THE INVENTION

The first object of the invention is accordingly to propose an architecture that enables remote use, with good ergonomics, of a service processor of a central system.

This object is attained in that the architecture enabling remote control of an application includes a first service processor (1) connected via a network and a maintenance unit (40) with channels connected to a central system (4), the service processor (1) being connected via a service console switch (30) to a maintenance service console RMS (6), and to a remote service console RSC (5), characterized in that each service processor and each console further includes operating system programs, a supervisor program, and at least one service, program broken down into two applications one called the "body", comprising the program algorithm, and the other, "presentation", including the interface, with the user enabling a windows-type display with a menu bar.

Another object of the invention is to permit the use of a reserve service processor to present a service that is executed by the working processor.

This object is attained in that the reserve service processor includes means for running the presentation application corresponding to a service, and means for communicating with the working service processor, including means for running a body application of a service the presentation of which is done with the reserve service processor at the same time, and the body application, as well as the presentation of a second service, the presentation of which is done on itself.

In another characteristic, each service processor or console includes a supervisor program handling the request numbers of the services and assuring the startup of the services.

In another characteristic each service processor includes means for processing communications with the other service processor.

In another characteristic, each console includes means for processing communications with one of the service processors, via the service console switch.

In another characteristic, the presentation program of the application includes windows generated as a function of the application and stored in a memory, and a message communication module (183) linked to the presentation program of the application and containing primitives intended to receive messages containing the address of the memory block in which the message is stored, or for transmitting messages containing the address of the memory block of the body program containing the command corresponding to the response furnished by the user to the message received.

In another characteristic, the body program of the application includes a message communication module (173) linked to the body program of the application and containing primitives intended to transmit messages containing the address of the memory block containing the message, and to receive messages containing the address of the memory block of the body program in which the response furnished by the user is stored.

Another object of the invention is to propose a use of the foregoing architecture in a method for replacing boards, including a presentation application comprising displaying, in a dialog box, the identity of a group of elements to be selected; selecting the identity of the group of elements by validating the identity via a mouse or a keyboard; selecting from the group one of the elements by highlighting this element; and validating the selections by clicking on the zone containing the message "OK" with the mouse.

In another characteristic, the presentation application further comprises displaying, in a dialog box, a message indicating that the slot is occupied, and that the system will attempt to copy its contents, and a question requesting the confirmation or stoppage of the service, and selecting the confirmation or stoppage of the service by clicking on a "yes" or "no" zone.

In another feature, the method comprises displaying, in a dialog box a, the group of elements in which a second element will be selected by highlighting this element, and validating the selection by clicking on the zone containing the message "OK".

In another feature, the method comprises the presentation application and further comprises requesting confirmation of the request for insertion of a new board; indicating, in a dialog box, that the user can perform the change, and after that, requesting confirmation or cancellation; confirming or cancelling the replacement by clicking on a slot indicating that the second slot is full or empty.

In another feature, the method comprises the presentation application and further comprises displaying the execution of the test on the board put into place; displaying the success of the copying of the information contained in the first element; and a message authorizing withdrawal of the card from the first slot; asking the user for confirmation or cancellation of the withdrawal, by clicking on a zone indicating the first slot is empty, or occupied.

Further characteristics and advantages will become apparent from reading the ensuing detailed description, with reference to the accompanying drawings.

BRIEF DESCRIPTION OF THE DRAWINGS

FIG. 7 shows the formats of message texts;

DESCRIPTION OF THE PREFERRED EMBODIMENTS

Figure 1:
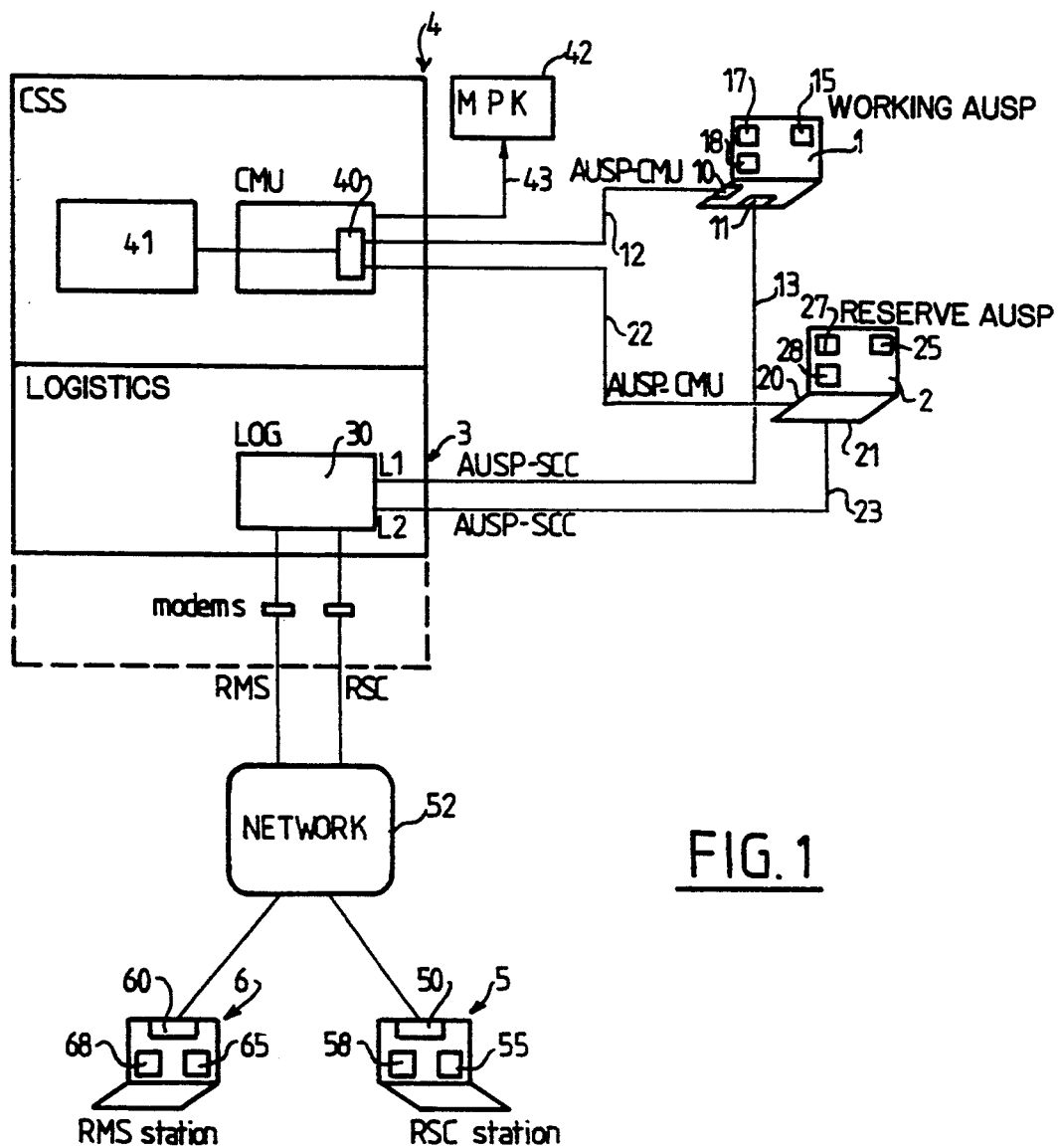
FIG. 1 is a diagram of the entire system.

The system architecture, as shown in FIG. 1, comprises a working service processor 1, connected via interface software MSH (maintenance console handler) 10 to a processing line for the maintenance of the telecommunication consoles forming a network of the STARLAN type. This line 12 is connected to a clock and maintenance unit 40, which assures communications between the service processor 1, a second, reserve service processor 2, connected via a second line 22, and a central system 41. The maintenance and clock unit 40 of a central subsystem 4 also communicates via a line 43 with a set of maintenance processors MPK 42. The working service processor 1 and the reserve service processor 2 also communicate, via a respective remote line handler RLH 11 and 21, with a service console switch 3, which by way of a circuit 30 and a suitable switching matrix makes it possible to put each of the service processors into communication with the telecommunications network of a given country, and through this network with a station 5 comprising a remote service console RSC communicating with network 52 by way of an interface program RSC 50. Each of the service processors can also be put into communication, through the network 52, with a remote maintenance station RMS 6 that communicates with the network 52 via an interface software RMS 51. The lines 23 and 13 connected to the service console switch via the interface software 21 and 11 have output rates of 4800 baud, while the lines 12 and 22 forming the STARLAN network, and connected to the maintenance and clock unit 40, have outputs on the order of 1 megabit per second. The maintenance processors 42 are connected to sets of input/output units for the central system.

Figure 2:
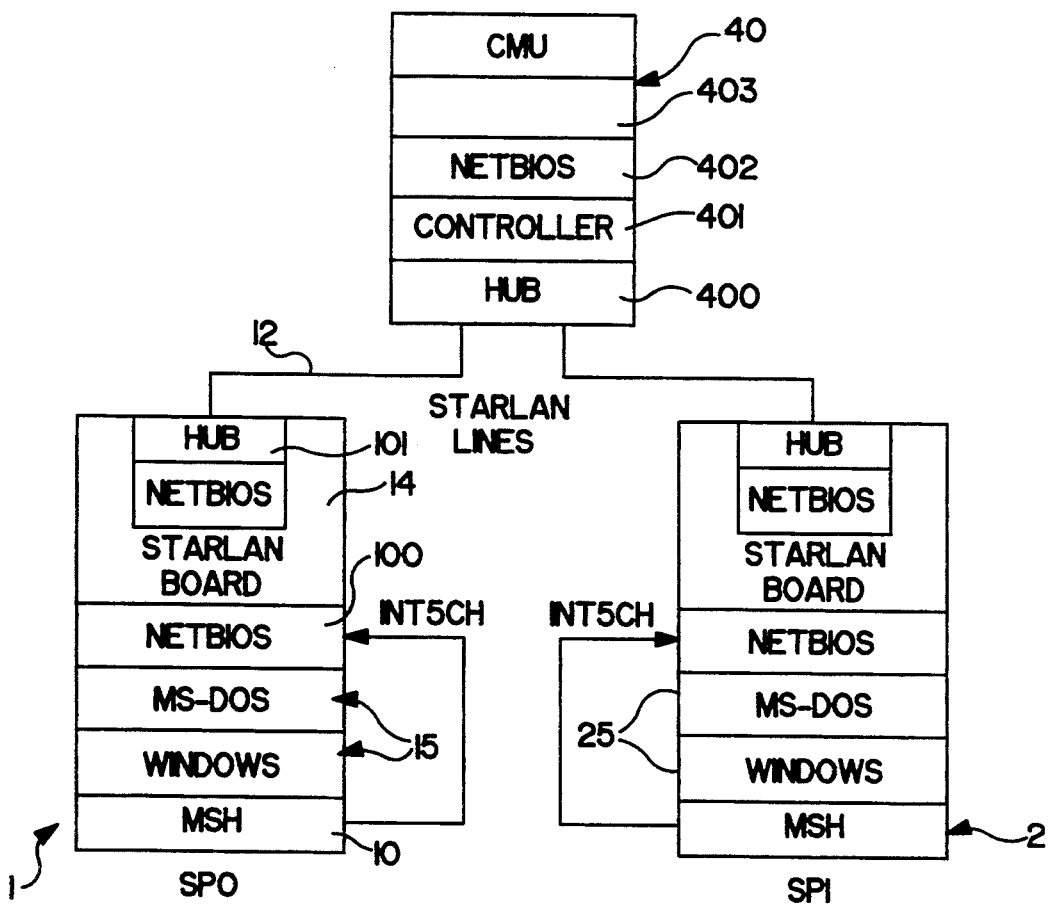
FIG. 2 shows the hardware and software means that put certain parts of the system into communication.

FIG. 2 shows the software environment that enables the service processors 1, 2 to communicate via the STARLAN network by means of the maintenance unit 40. The working service processor also includes MSH software 10 and an operating system including the disk operating system MS-DOS, a multitasking windows-type of software such as WINDOWS, and a software part to be described hereinafter. The working service processor also includes NETBIOS communications software 100 that communicates via a board 14 of the STARLAN network type and a hardware element 101 comprising a gateway, through the line 12 of the STARLAN network, to a second gateway 400, a handler controller circuit 401, a NETBIOS interface software 402, and software for interfacing with the service processor 403. Similarly, the reserve service processor 2 will also include the same elements, but with the digit "2" in the reference numeral to indicate tens or hundreds.

In its operating system 15, 25, each service processor also includes a body program for a given application 17, 27 (FIG. 1) and a presentation program for the application 18, 28 (FIG. 1). Similarly, the remote consoles 5, 6 may, like the service processors, comprise microcomputers having a mouse in addition to the keyboard, and an operating system 65, 55 that, as for the service processors, comprises the disk operating system MS-DOS, multiple-window WINDOWS software, and supervisor software SPV, the role of which is to trigger the presentations in the console or consoles. A module LPXMS makes it possible to store incidental messages and all the dialogs of all the services in the files LOG and LOGM, respectively, of the hard disk. The supervisor of the working service processor also knows the state of connection or disconnection of the consoles via RLH, so as consequently to command a console switch 30 and configure the presentations, as will be seen hereinafter. Similarly, the clock and maintenance unit 40 make it possible to trigger the second service processor in the event that the first is defective, and the supervisor SPV sets up the same applications in the latter. Remote stations 5, 6 also include presentation software 58, 68 corresponding to the presentation software of the body programs of an application being run on a respective service processor 1 or 2.

Figure 3:
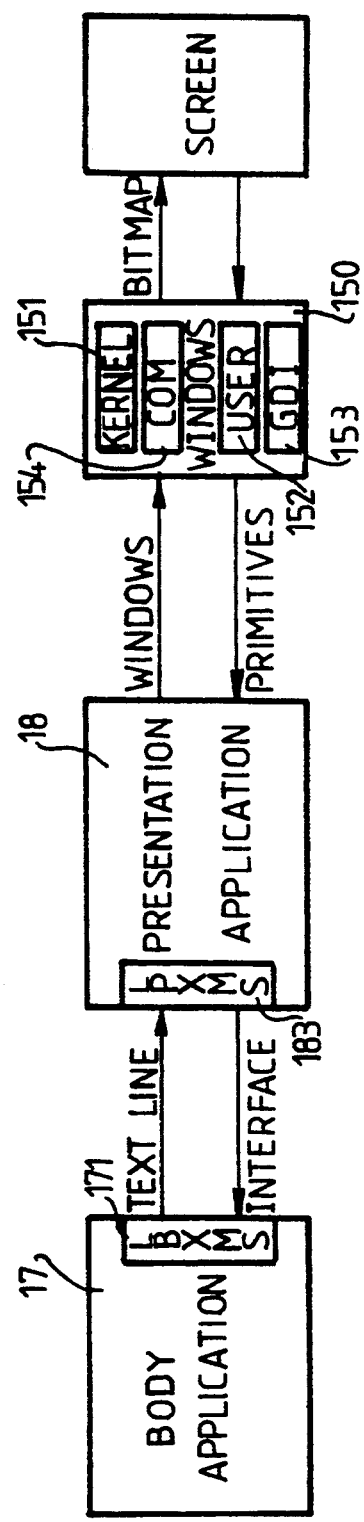
FIG. 3 shows the principle of the architecture of the invention.

FIG. 3 illustrates the principle of the architecture required to implement the invention, in which the body program 17 of a given application, being run for example on the working service processor, exchanges lines of text and acknowledgement or response messages with the presentation program 18 of the application. These exchanges of messages and text lines are done by way of library message handling modules LBXMS 171 and LPXMS 183, which are linked respectively to the body of the application and the presentation of the application. The presentation program of the application exchanges the necessary primitives for handling tasks and displaying windows with the WINDOWS software 150. The presentation application will have been developed with the aid of the WINDOWS program 150, which can be seen as a set of four components: a first core component (kernel) 151 that assures the handling of tasks, the memory allocations, the timer function and the dynamic links; a second user element 152 that serves to assure handling of the windows and creation thereof; a third element GDI 153 that makes the graphic function possible, in order to make drawings; and a fourth element COM 154 that assures the functions of asynchronous communications, for example by means of a DDE protocol (DDE=dynamic data exchange), which is a protocol for data exchange between applications and enables communication between applications.

The communication with the text lines makes it possible to reduce the density of information with respect to communication comprising a set of WINDOWS primitives, which are used to generate a screen, and consequently to speed up the exchanges.

Figure 4:
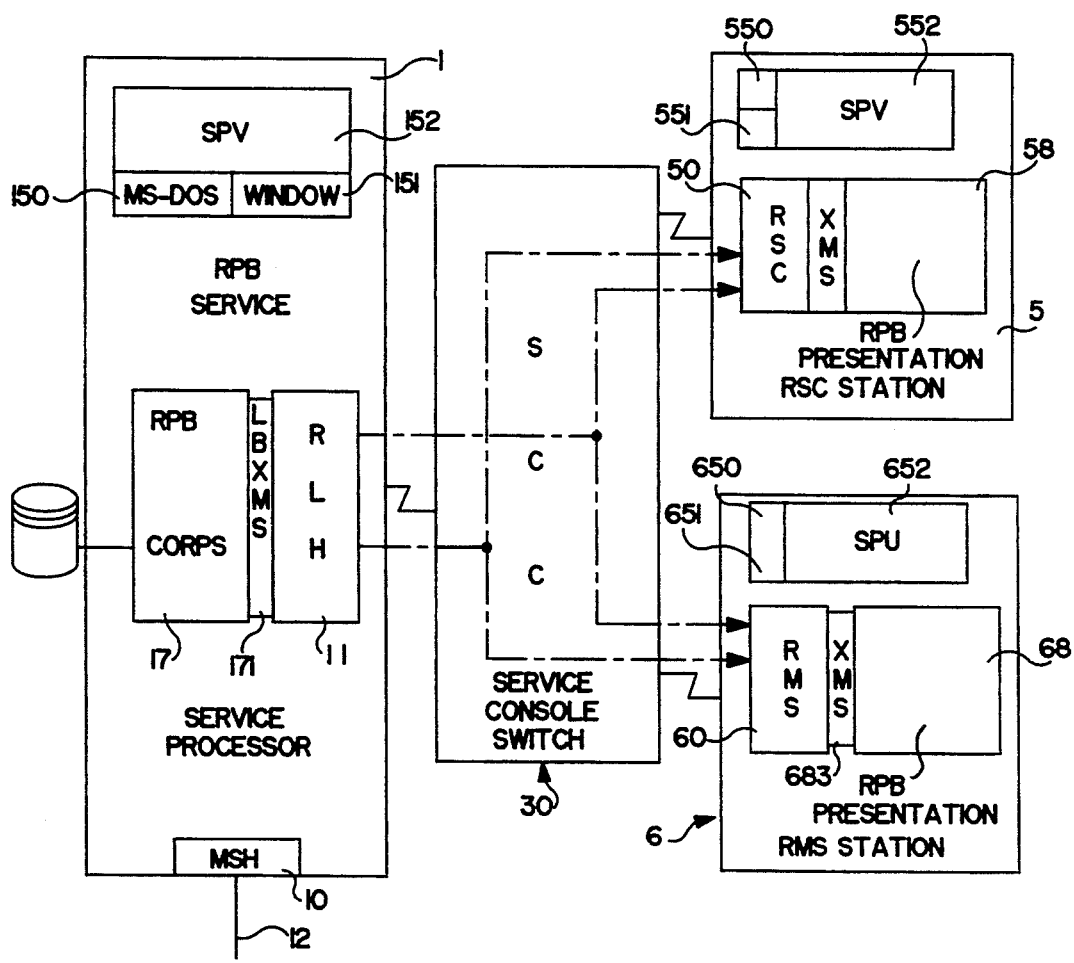
FIG. 4 shows the diagram for using the principle of the invention in communication between a service processor and remote consoles.

FIG. 4 shows the functioning of the architecture in the case of a working service processor 1 connected by way of a service console switch 30 to the remote maintenance console 6 and to the remote service console 5, comprising a microcomputer. This microcomputer, like the service processor 1, includes a mouse and an operating system 550, 551, 552, which in turn respectively comprises MS-DOS and WINDOWS software and a supervisor SPV. For the maintenance station, the operating system is constituted in the same way by the elements 650, 651, 652. An RSC interface 50 assures the interface between the telecommunications lines and the microcomputer 5, and through these telecommunications lines to the service processor that in turn is interfaced with the communication lines by the RLH interface 11. Similarly, the maintenance station includes an RMS interface 60 that has the same functions as the RSC interface. This RSC interface communicates via a library message module 583 linked to the presentation of the application 58 comprising a replace board application RPB. The body of the board replacement application 17 is run on the working service processor and is linked to a message library enabling communication with the RLH interface 11. By way of a switching matrix and the information furnished by the RLH interface of the working processor 1, the service console switch 30 makes it possible to route the messages originating in the service processor directly to the two consoles, if these two consoles are connected; to route all the messages output by the remote service console 5 to the service processor 1 and the maintenance console, if it is connected; and to route all the messages output by the maintenance console to the service processor. This is made possible by the fact that RLH, to the extent that the consoles are connected, establishes a dialog with the respective RSC or RMS interface and notifies the supervisor program 152 of the status of connection or disconnection of the consoles of the network. This table then serves to establish communications through the console switch 30.

Figure 5:
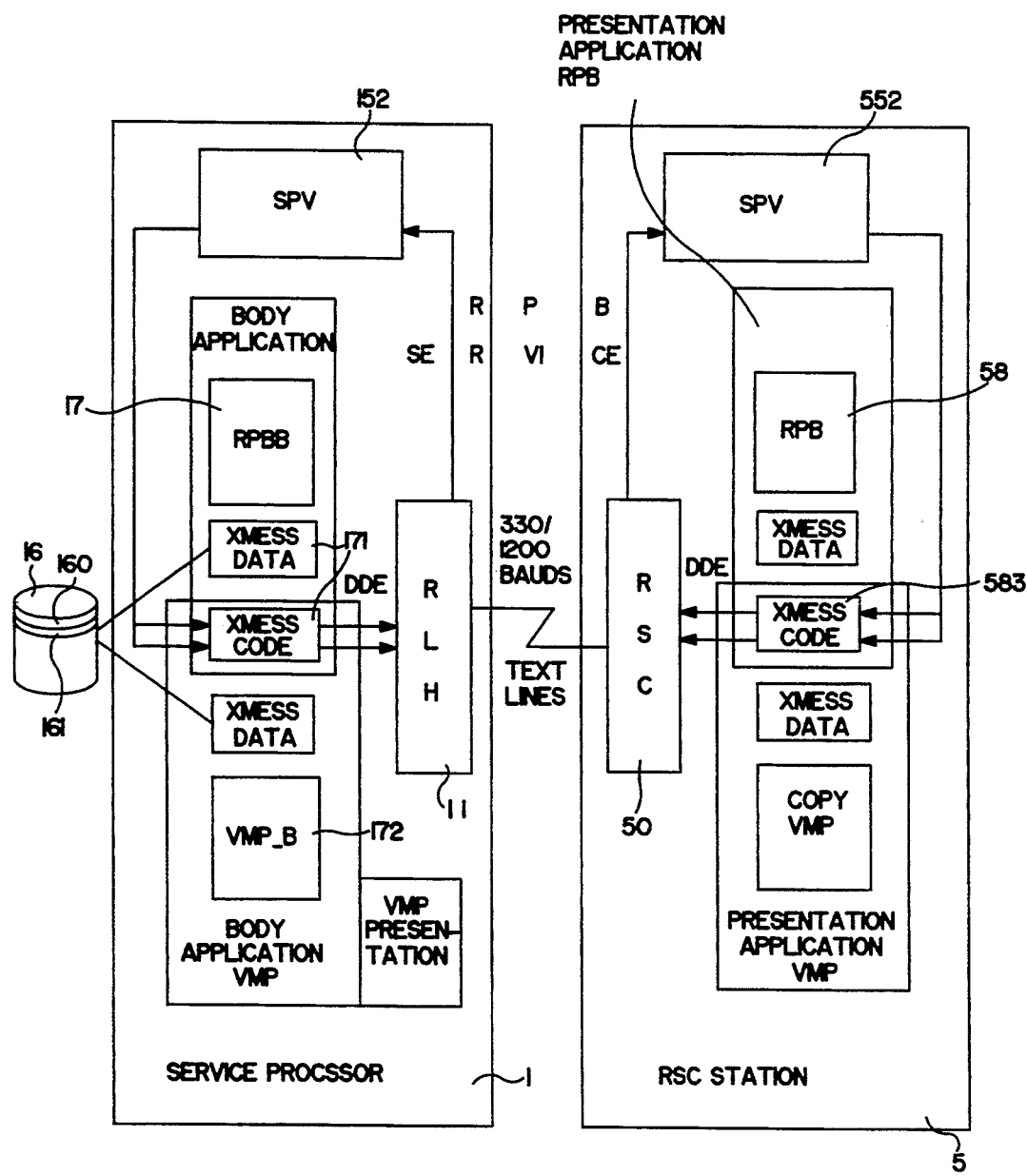
FIG. 5 shows the diagram for the principle of use of the invention in the case of a service processor and a single remote console.

FIG. 5 shows the functioning of the architecture described, in the case where the service processor 1 is in communication with a remote console 5, which serves to effect the presentation of an RPB application 58, by way of the library module XMESS 583 and the RSC interface 50, which communicates via the network with the RLH interface 11 of the service processor. In this communication, the service processor executes the body program of the application 17, and the supervisor 152 stores the incidental messages and all the dialogs of all the services being run on the service processor on a disk 16, respectively in a LOG file 160 and a LOGM file 161.

The RLH interface 11 observes the remote stations through the service console switch (SSC) 30 and carries only one data communication line connecting RLH and SCC. The two data communication lines linking the service processor with the RMS and RSC stations are carried by SCC.

In the architecture of FIG. 5, the service processor 1 may for example execute a different application, called VMP, and by means of the presentation program of the VMP application, can present this application on a monitor, while the second application RPB is presented on the monitor of the station RSC. At the same time, a copy of dialog of the VMP application will be available on the RSC station.

Figure 6:
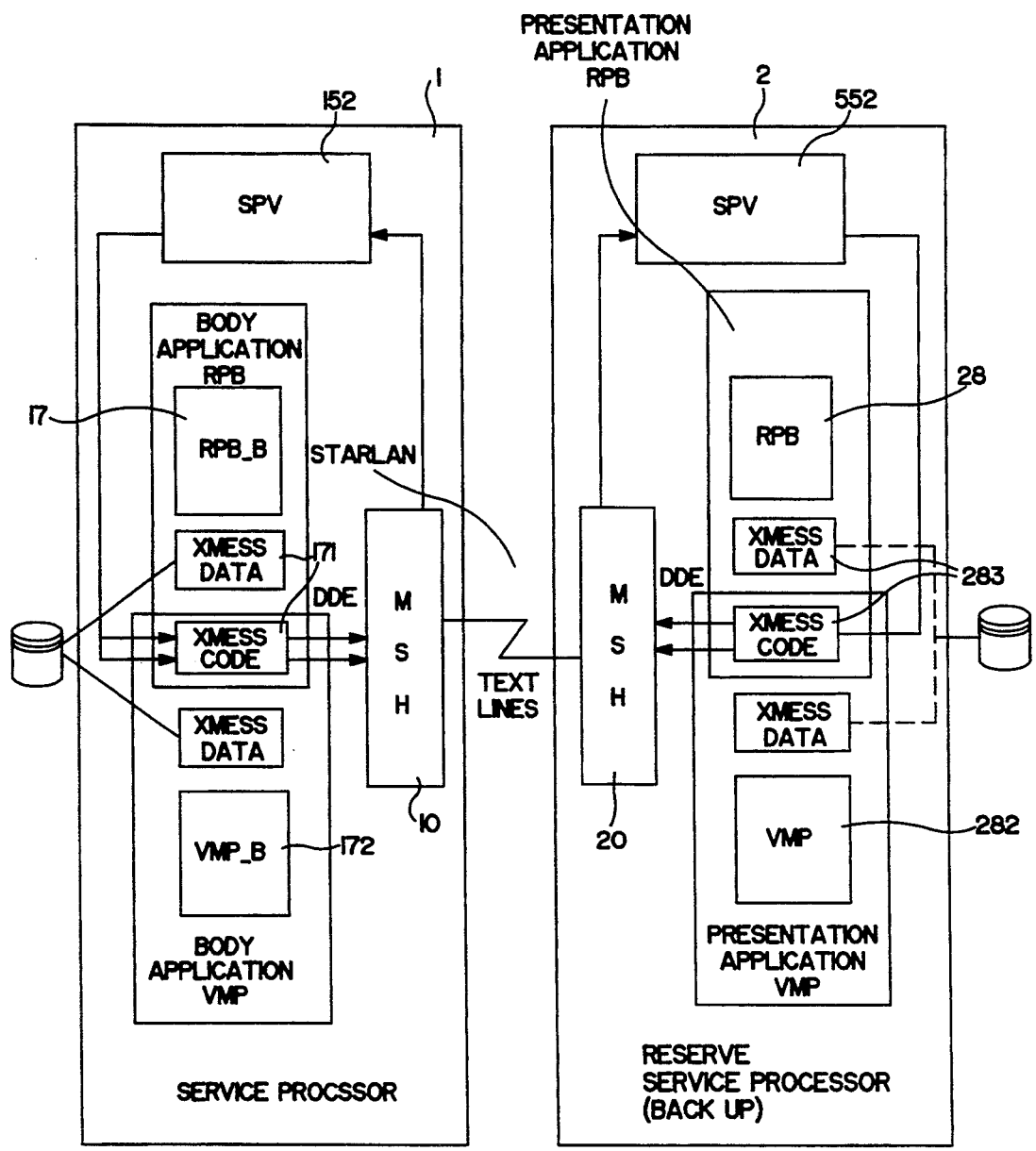
FIG. 6 shows the diagram for the principle of use of the invention in the case of a working service processor and a reserve service processor.

FIG. 6 shows another advantage of the architecture proposed, which for example makes it possible to use the reserve service processor 2 to effect the presentation of an application that is run on the working service processor 1. This has the advantage of enabling use of a reserve service processor, which given the increasing reliability of hardware is becoming less and less important in its role as a reserve service processor, and can be used as a complementary console for presentation of an application.

In the case of FIG. 6, the service processor 2 executes the presentation of the RPB application 27, while the body of the RPB application is executed by the working service processor 1. The service processors 1 and 2 communicate between one another via the MSH interfaces 10, 20 and the STARLAN network, as shown in FIG. 2.

FIG. 7 shows the format of the messages. The first type of format corresponds to the messages exchanged between the body of an application and the library module XMESS. In that case, the format comprises a message number, which may be VSH 001 or RPB 120, in the case of the board replacement application, followed by the text of the message, which may be "my prefixed message", or in the case of the board replacement application, "The requested slot contains a board."

When the messages are exchanged between the library modules XMESS of two remote interfaces, the message comprises the name of the service, which may be SYC 01, in this case, followed by the message number and the number of the text as seen above. The archived messages, shown in the last lines, will insert the date and the time before the format of the interface message XMESS.

FIGS. 8-16 show an example of an application, in which its body and its presentation can be separated by the principle of the invention.

Figure 8:
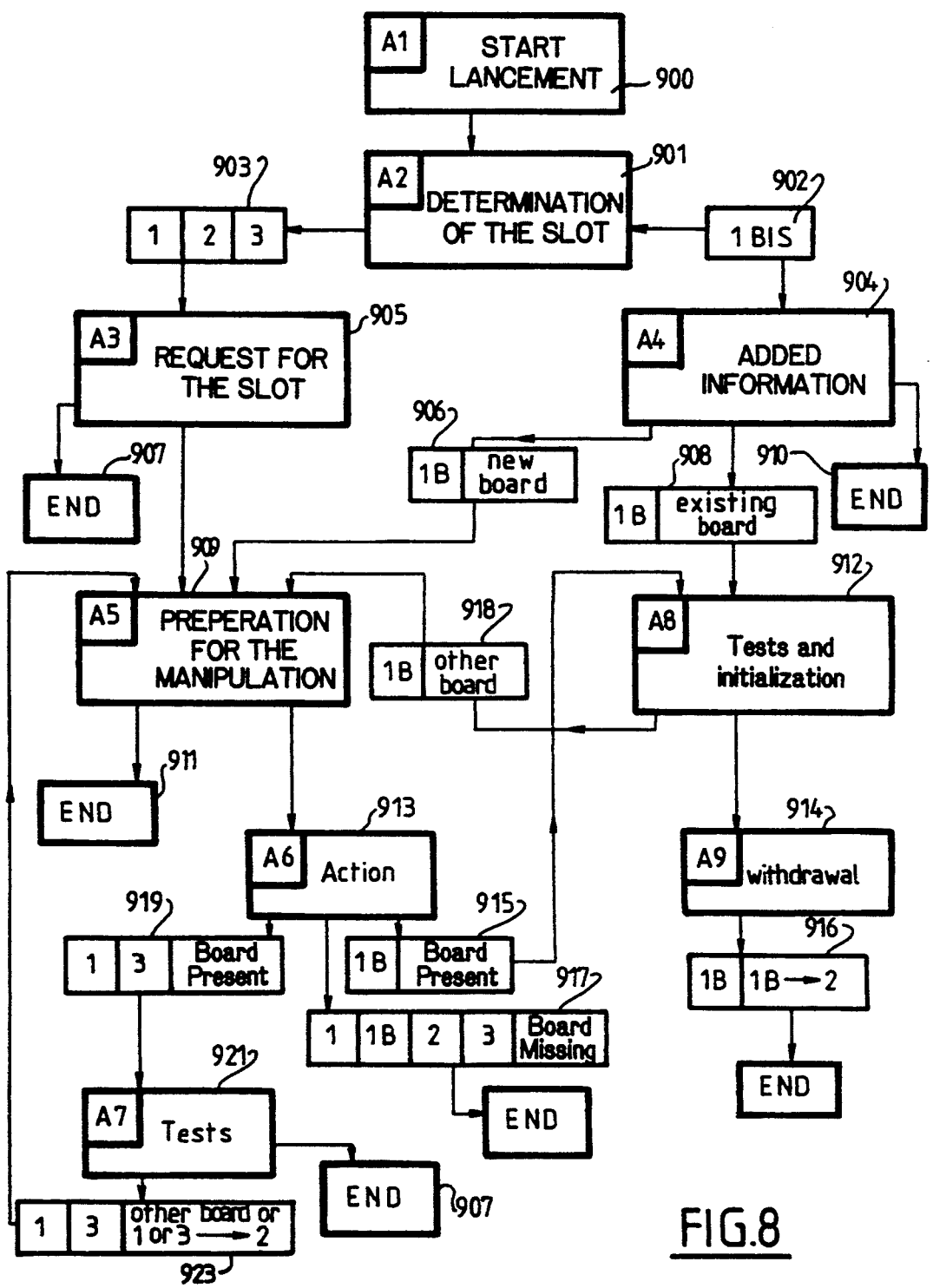
FIG. 8 is a mimic flow chart of the course of the program of board replacement forming the body of the program.
Figure 9:
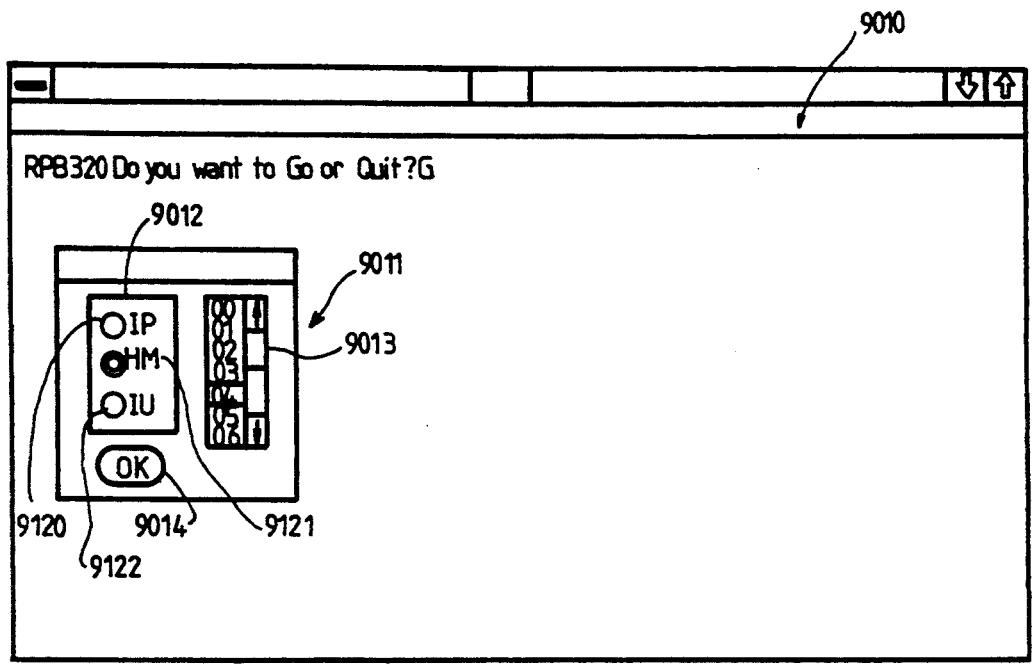
FIGS. 9–16 show the various steps in the presentation program of replacement of a board.
Figure 10:
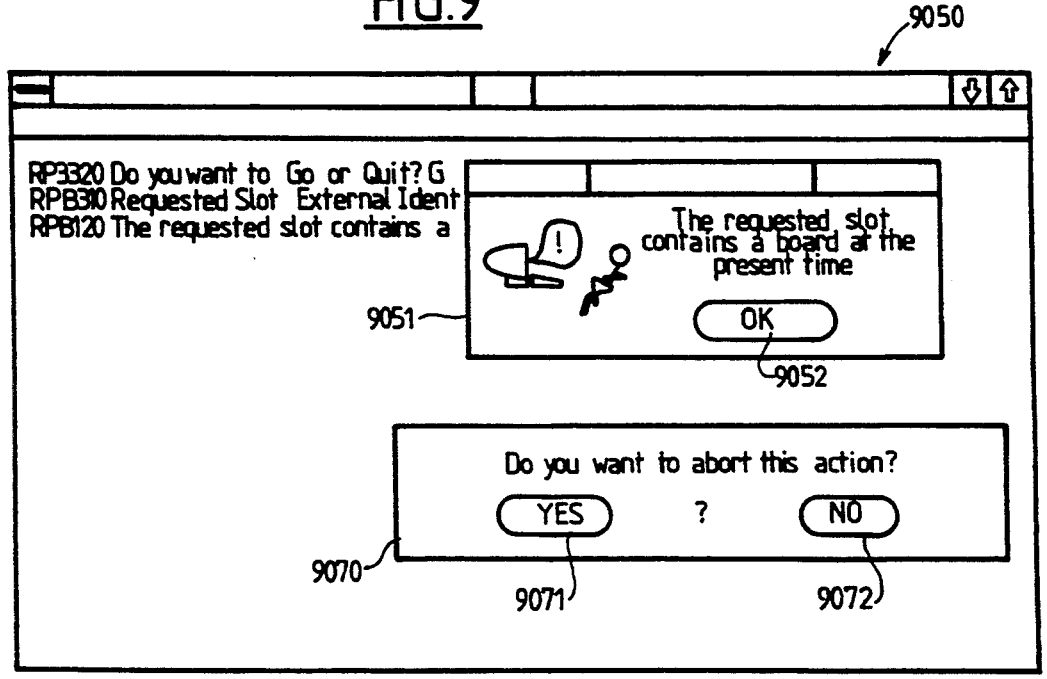

The algorithm of the course of the body program is shown in FIG. 8, while FIGS. 1-15 show the results produced by execution of the presentation application.

The generation of the various windows corresponding to FIGS. 9-16, forming one part of the presentation application corresponding to the program of the body application for board replacement, has been done for example by using the method for generating dialog windows that can be seen on the screen of a data processing system, and by using the apparatus for employing this method taught in French Patent Application No. 88.08381 filed on Jun. 22, 1988 by BULL S. A.

The first step comprises triggering of the service RPB, indicated by reference numeral 900. This step comprises first causing the service supervisor SPV to appear in a window, for selection of the various board replacement services RPB on the menu, and triggering it by clicking on its name with the mouse. Once the service has been triggered, the first question that RPB asks is to furnish it the identity of the physical location where the manipulation will be performed. This is indicated by a step 901 on the flow chart. This step, in the presentation program for board replacement, is translated into the appearance of a window 9010 (FIG. 9), inside which a dialog box 9011 is shown, which includes a first set 9012 comprising a box of three radio buttons, each corresponding to the types of elements that might be replaced. The first 9120 corresponds to the central processor units IP; the second 9121 corresponds to the memory units HM; the third 9122 corresponds to the input/output units IU. This dialog box includes a listing box 9013, which once a type of element has been selected, for example the memory units type, by clicking on the radio button facing it, causes the list of the various elements of the memory unit that might be selected to appear in the listing box. This list appears by a scrolling system well known to WINDOWS users. Once the type of unit has been selected and its identifier indicated, the choice is validated by clicking on a validation zone 9014 with the mouse.

Figure 17:
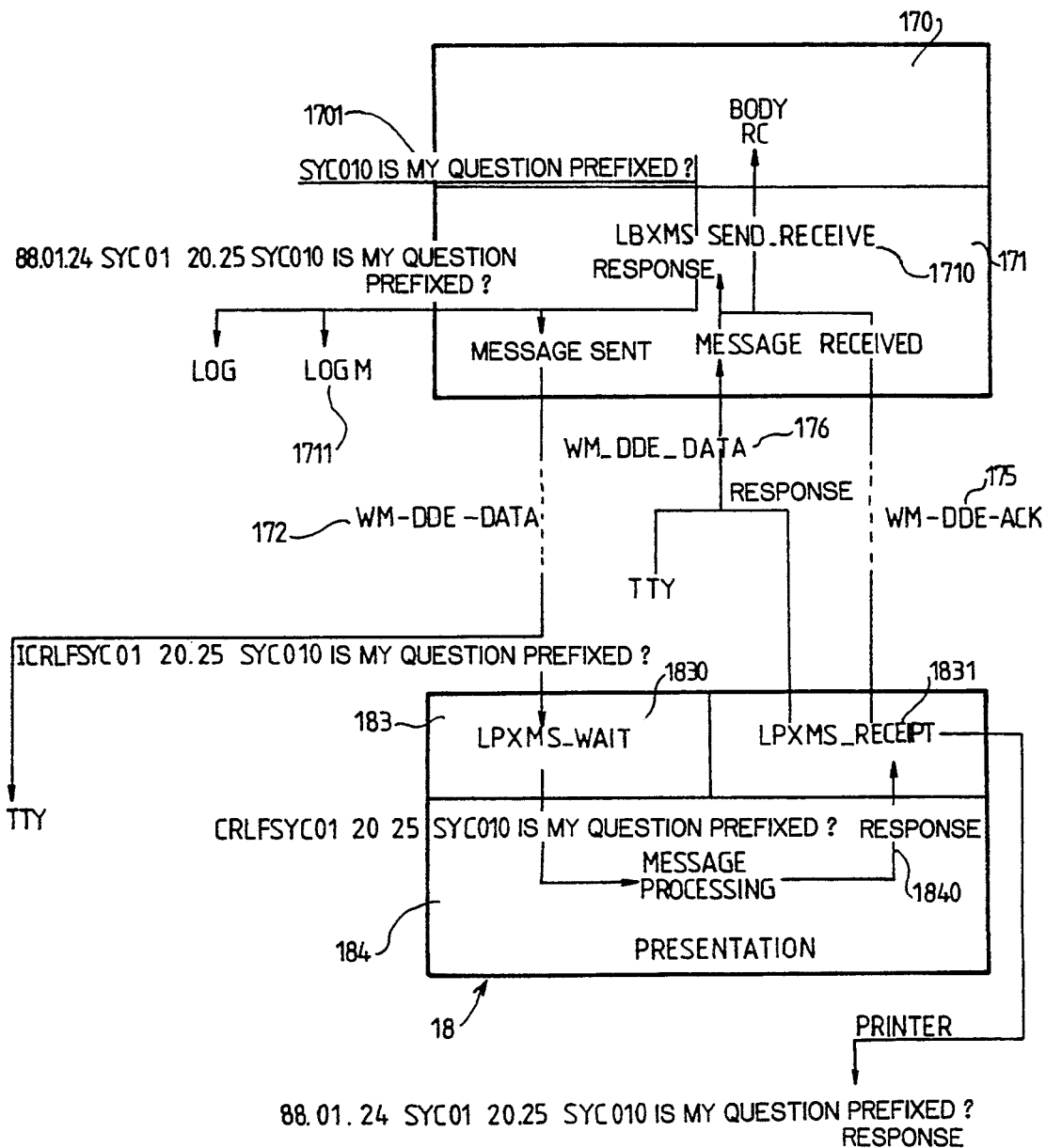
FIG. 17 is a mimic diagram of exchanges of messages between the body of an application and the presentation of this application, in the case of a presentation performed on the same hardware for a question/response message.

After the slot determination step 901, the body program passes to the step for requesting a slot to permit the desired manipulation. If the physical unit present in the slot selected is unavailable, the body program, in the presentation program, causes the display of this information and then interrupts and goes to step 907. The display of this unavailability information is translated, between the body program and the presentation, into the exchange of a message with the reference symbol and numeral RPB 120, indicating "The requested slot contains a board at the present time". This message, processed by the presentation program, causes the window 9050 (FIG. 10) to appear, in which a dialog box 9051, a graphic element and the message phrase appear, along with a validation zone 9052 which after having been clicked on with the mouse makes it possible to acknowledge reception of the message, as shown in FIG. 17.

A second dialog box in this window asks: the user whether he wishes to abort this action or continue it. This second box contains the zone 9071 that corresponds to aborting the action and detours the body program to the "end" step 911 (FIG. 8). A second zone 9072 (FIG. 10), via a message response sent to the body program, initiates the continuance of the manipulation via the step of preparation for the manipulation, 909 (FIG. 8), of the body program.

Figure 11:
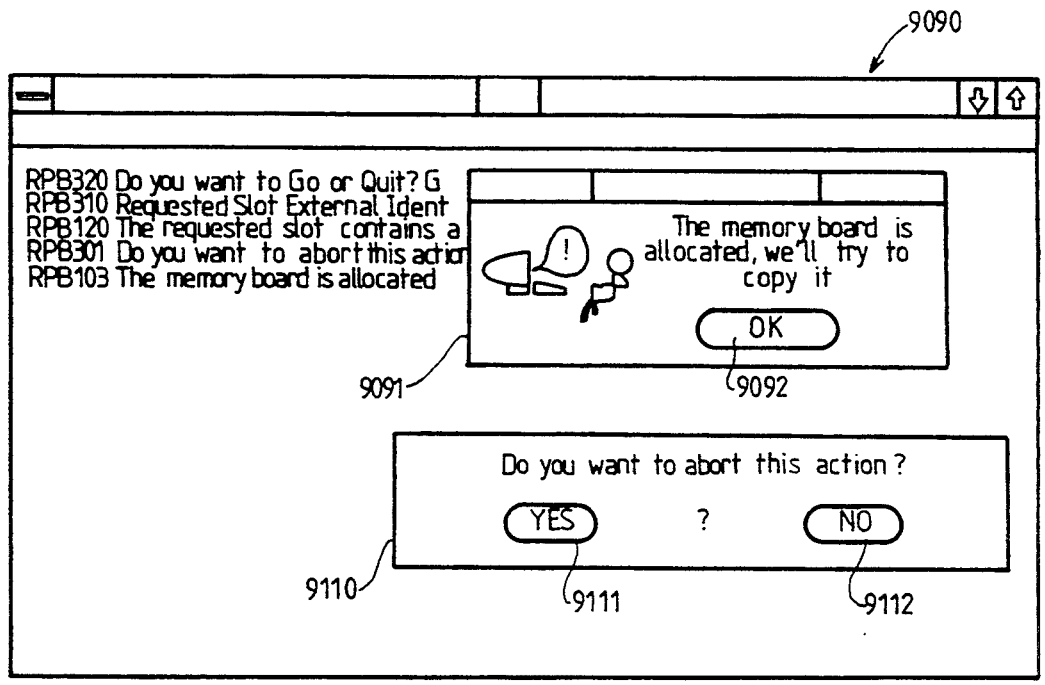

If the slot is free, or if the unit that it contains is not used by any service or system, the body program RPB informs the presentation of the success of the request via a message and prepares the manipulation in step 909 by indicating to the user that the system is attempting to copy the unused board. This is shown in FIG. 11, by the window 9090, which includes a dialog box 9091, in which a message "The memory board is allocated, we'll try to copy it" appears, and a validation zone 9092. The window 9090 also includes a second dialog box 9110 in which a first zone allows the user to abort the action, as represented in step 911 of FIG. 9, and a second zone 9112 makes it possible to continue the action by proceeding to step 913 of the flow chart of FIG. 9.

The step of determining the slot 901 can optionally be followed with a step of supplementary information 904, for example in the case where one wishes to proceed with recopying a memory board to a location of the board intended for the recopying. This step initiates the display, in the presentation program, of the window 9040, which includes a dialog box 9041 constituted identically to the dialog box 9011.

In the example shown, the information is to be recopied from the memory unit HM04 to the memory unit HM08, in which a memory board is to be inserted. This step 904 is followed by a step in which it is determined whether the user expects to use a new board or a board in place for the recopying; this corresponds to steps 906 or 908 in the flow chart of FIG. 9. These steps initiate the display in the presentation program of a window 9060 (FIG. 13A), which includes a dialog box 9061 with the question "Do you have a new board to insert?", and a "yes" response zone 9062, indicating that there is a new board, and a "no" response zone 9080, indicating that the user intends to use an existing board. The response zones are validated in a known manner with the mouse of the service processor or the remote station used to run the presentation.

If the user wishes to use an already installed board, which generally is true only in exceptional cases, then RPB verifies that the intended unit is available, and if so requests it by the step 912 (FIG. 9), which will be described in further detail hereinafter. In the case where the user wishes to use a new board, RPB assures that the intended slot is indeed empty, and if so, they request it in the course of steps 909 for preparing for the manipulation.

Once the manipulation has been prepared for, the body program receives the green light from the central unit, and indicates that the manipulation can be done in the "action" step 913. This "action" step 913 initiates the display, at the level of the presentation program PRPB, of the window 9130 (FIG. 13B), which includes a dialog box 9131 including the message authorizing the insertion of the board in the defined slot, and includes a second dialog box 9132 requesting whether, once the operation has been completed, the slot is full or empty, by validating one of the two radio buttons 9150 or 9170, respectively. Next, the operation is validated by clicking on the zone 9133 with the mouse.

In the case where the user is to add a board, the body program continues with the step 921, in the course of which a test of the board in place is performed, before its definitive insertion into the installation is authorized. These tests will be performed by the "DGM" service, which will be triggered automatically by RPB, and RPB will wait for the result. Once the result of the test has been transmitted by DGM or RPB, the presentation program for board replacement informs the user of the result of the test. This is done with the RPB message 111, "All right, the new board init is successful". In this case, the service reaches step 907. In the event that the new board is invalid, the body program RPB proposes a new change of board in step 923, and if this is accepted by the user, the program returns the user to step 909.

In the case where one wishes to proceed to make an exchange and recopying of a memory board at the end of step 913, then the body program RPB returns the user to step 912 for testing and initialization. In that case, once the memory board to be recopied has been introduced, the body program RPB attempts to initialize it. This is indicated by the presentation program RPB by displaying the window 9120, in which a dialog box 9121 displays the message "Tests in progress" along with a validation zone 9122 making it possible to acknowledge reception of the message sent by the body program RPB. If the new board is valid, RPB verifies that it is indeed compatible with the faulty board it is intended to replace, and if so, then RPB makes the recopy and the exchange and indicates that the old board, the identifier of which it repeats, should be removed.

The initializing step is represented in the window 9123 (FIG. 15A) by the dialog box 9124, which contains the message "All right, the copy is successful", and a validation zone 9125 makes it possible to acknowledge reception of the message. After this display and the validation of this message, the body RPB sends a second message informing the user that he can now withdraw the board. This message is displayed in a dialog box 9126 and also includes a validation zone 9127 enabling acknowledgement of reception of this message. In the event that the board is incompatible, RPB signals that it must be withdrawn and repeats its identifier.

In the case where the board has been found invalid after testing, RPB proposes to the user that new exchange be made, and if the user accepts it, in step 918, the program returns the user to step 909.

The withdrawal step 914 causes the window 9140 (FIG. 15B) to appear, which contains a dialog box 9141 including a drawing 9142 and a message 91410 indicating that the board located in slot HM04 must be withdrawn. This dialog box also includes a box of radio buttons 9143 requesting an indication when the operation has been completed, and via the radio button 91430, making it possible to indicate that the slot if full, and via the radio button 9431 to indicate that the slot is empty, and consequently that the board has indeed been withdrawn. This dialog window is invalidated via a validation zone 9144 making it possible to validate the responses clicked on with the mouse.

Once the withdrawal has been done, the program brings about the display, in step 916, of the message shown in the dialog box 9160 (FIG. 16), indicating that the copy has been done normally, and that there has been no particular problem. The user acknowledges the reception of the message by validating the zone 9161.

The various steps of the body program have thus been described, along with the displays done by the presentation program associated with this body program, in a particular application, which is board replacement.

Figure 18:
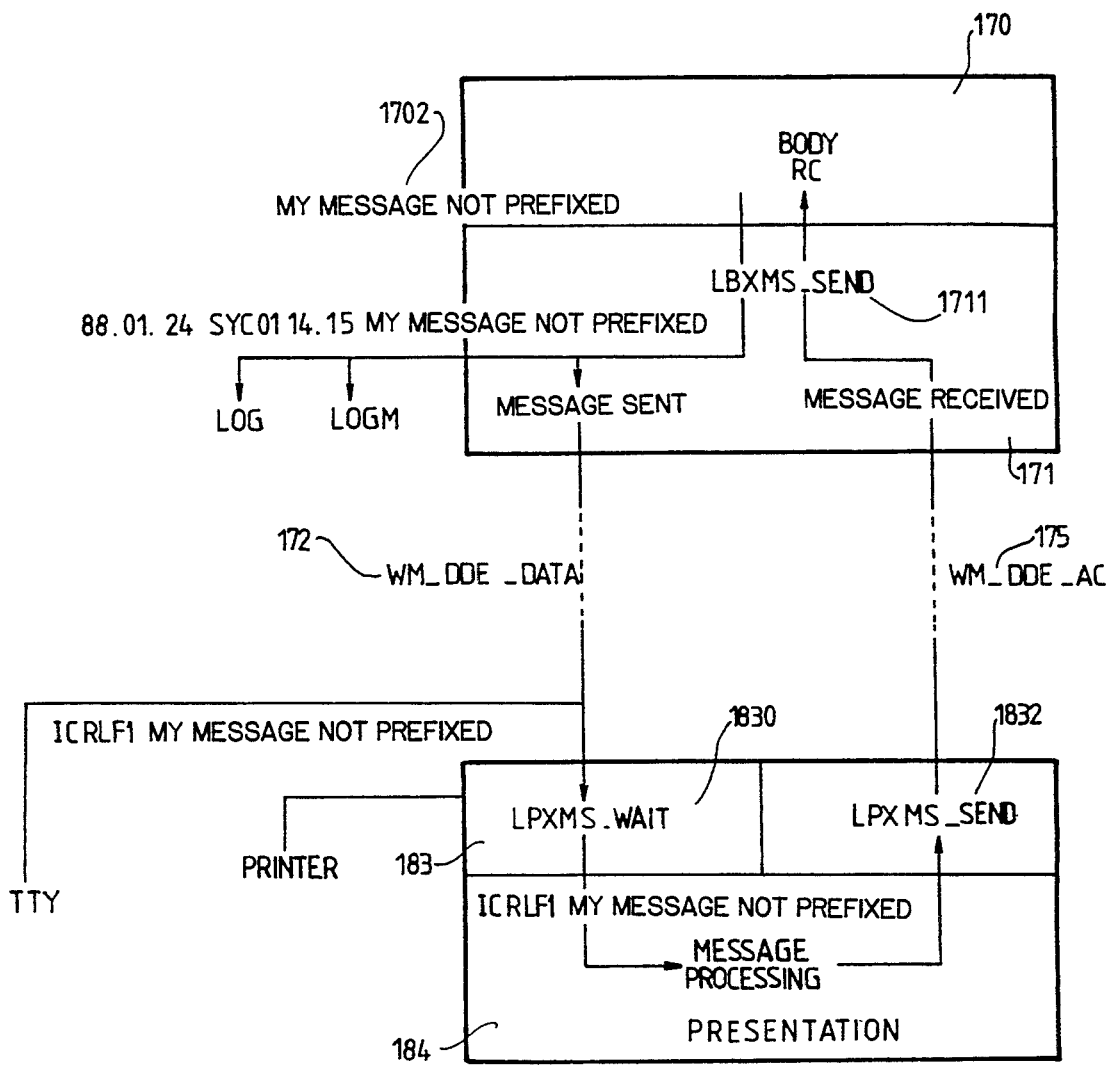
FIG. 18 shows the mimic diagram of the exchanges made between the body of an application and the presentation in the case of an unprefixed message not requiring any response.
Figure 19:
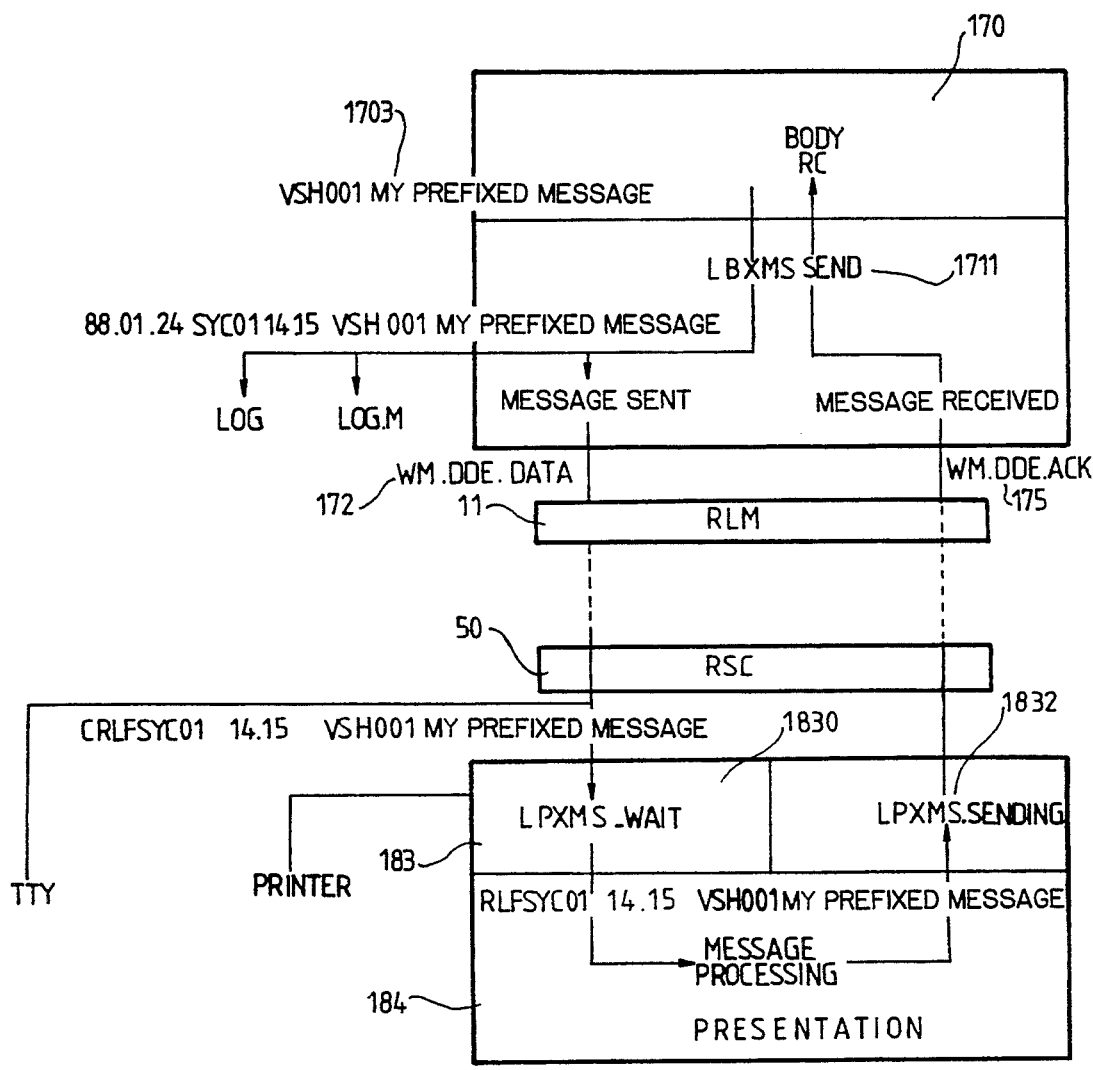
FIG. 19 shows the exchanges made between the body of an application and the presentation of the application, in the case of a presentation done at a distance from the application, for messages that do not require a response.

Since the displays of this presentation program have been developed with the aid, for example, of the method described in the French patent application entitled "Procédé pour la génération de fenêtres de dialogue visualisables sur l'écran d'un système informatique" [Method for Generating Dialog Windows That Can Be Displayed on the Screen of an Information Processing System], and the windows thus generated are stored in a memory and called up as needed for display via the messages generated by the body program, as will be explained in conjunction with FIGS. 17-19 below.

FIG. 17 shows the exchanges between the body 170 of an application and the presentation 184 of this application, in the case of a message that requires no response and for a presentation implemented on the same entity. The body program 170 of the application is linked to a library message exchange module 171. The body program 170 of the application is linked to a library message exchange module 171. When in the course of the body program 170 it arrives at a step for a message to be sent or a question to be sent, represented by reference numeral 1701 and in this case shown corresponding to a question with a prefix, the body program 170 makes use in the library module 171 of a message transmission and reception primitive 1710, or send/receive primitive. This primitive stores the message to be sent in a buffer memory of the service processor and sends a DDE (dynamic data exchange) message 172. In the course of this operation, the message exchange program XMS writes the message in the hard disk file LOGM 1711, which contains the dialog of all the services. The dynamic data exchange message 172 sent by the service processor in which the body of the application is running to the presentation software running on the same processor, contains the address of the memory block that contains the message or question.

The presentation application and its message exchange module 183 is in a waiting state, represented by LPXMS_WAIT of step 1830. The presentation application 184 receives a message VM_DDE_DATA 172, and then this application reads the message at the address indicated. Once this reading has been done, the application processes the message, by looking in the presentation program of the application for the elements making it possible to perform the requested displays and receive the responses required by the question. Once the response has been furnished by the console user, this response 1840 is furnished to a receiver primitive 1831 of message exchange library module 183. This primitive makes it possible to send a first dynamic message 175 acknowledging reception of a question, and after the response has been formed makes it possible to send a message 176 containing the memory address at which the response has been stored, to enable the primitive 1710 to perform processing of the response, by reading the response contained in the address indicated by the message 176.

FIG. 18 shows the exchanges between the body 170 of an application and its presentation 184, in the case of a message not requiring a response and for a presentation implemented on the same entity, such as the working service processor. In this example, the message 1801 makes use of a sender primitive 1810, which after formation and preparation of the message with the necessary headers, sends a DDE message 182 comprising the address at which the prepared message is stored. Similarly, the message exchange module 183 connected to the presentation, once its receives the DDE message, reads the message at the address indicated and triggers the operation for processing the message in the presentation program. This message processing operation comprises looking, at adequate addresses, for the data corresponding to the displays to be performed, so as to enable the display of a window such as that of FIG. 14. When the message processing is done, the presentation module 184 activates the primitive 1832, which comprises sending an acknowledgement of reception to the attention of the body of the application 180.

As to the function in FIG. 19, the functional principle is the same as that of FIG. 18, the only difference being that the dynamic data exchange message 192 is sent to the attention of the program RLH, which handles the exchanges between the application 170, which is executed by the service processor, and the telecommunication lines by the protocols of these lines. This RLH program 11 interfaces with a second program RSC 50 or RMS 60, located at the remote console. The RSC program 50, upon reception of a message over the telecommunications line, signals the XMS application 183 for message processing of the presentation, which is in the waiting state, and transmits this message to the presentation application 184. The presentation application initiates processing of the message, and once processing is completed brings about the activation of the primitive 1832 comprising sending a reception acknowledgement to the RSC program, and then through the communications lines to the reception program RLH 11, which in turn converts the message into a dynamic data exchange message DDE 175, to the attention of the body of the WINDOWS application 170.

The architecture thus realized not only makes it possible for a second service processor or a remote station to execute the presentation of an application, the program body of which is executed at a distance by a first service processor, but also makes it possible to improve the man/machine interface.

Figure 20:
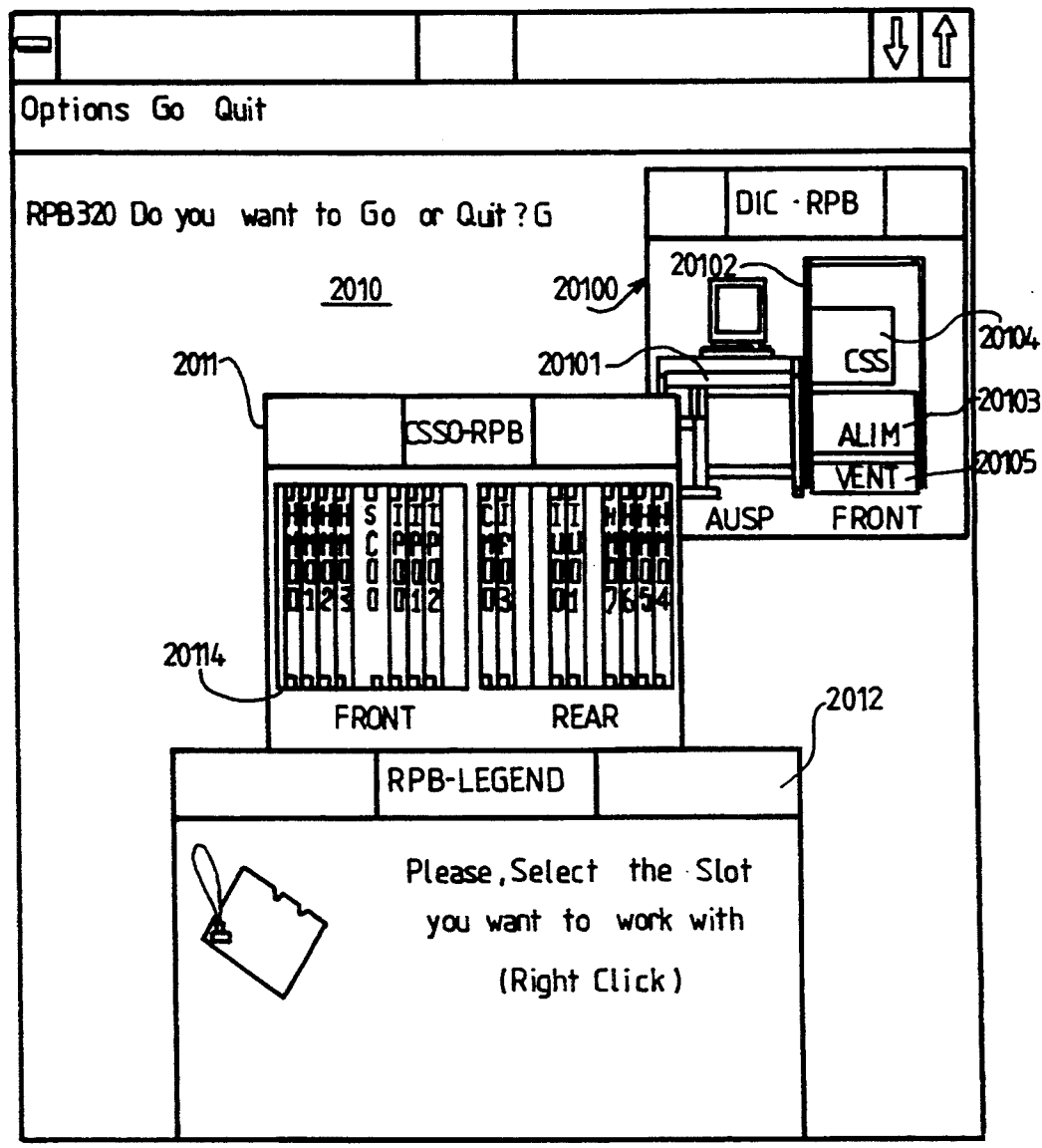
FIG. 20 is a variant representation of one of the steps of the presentation program for replacing a board corresponding to FIG. 9 or FIG. 12.

In a variant embodiment, the board replacement presentation program RPB includes a first step, shown in FIG. 20, comprising displaying, in a window 2010, a box 20100 causing the various constituent elements of the system to appear: the service processor AUSP 20101, the system cabinet 20102 containing the central subsystem 20104, the power supply block 20103 and the ventilation assembly 20105. Depending on the element selected by clocking on a cursor placed on top of the element to be selected, the presentation program causes a second box 2011 to appear, which for example in the case where the central subsystem 20104 has been selected causes the set of boards 20114 that is available on the front panel and the set of boards 20115 that is available on the rear panel of the cabinet to appear.

Selecting the representation of one of the boards HM for the memory, IP for the central processor units, or IU for the input/output units indicates the board that one wishes to replace.

At the same time, the program displays a message box 2012 requesting selection of the slot in which one wishes to replace the board.

Figure 12:
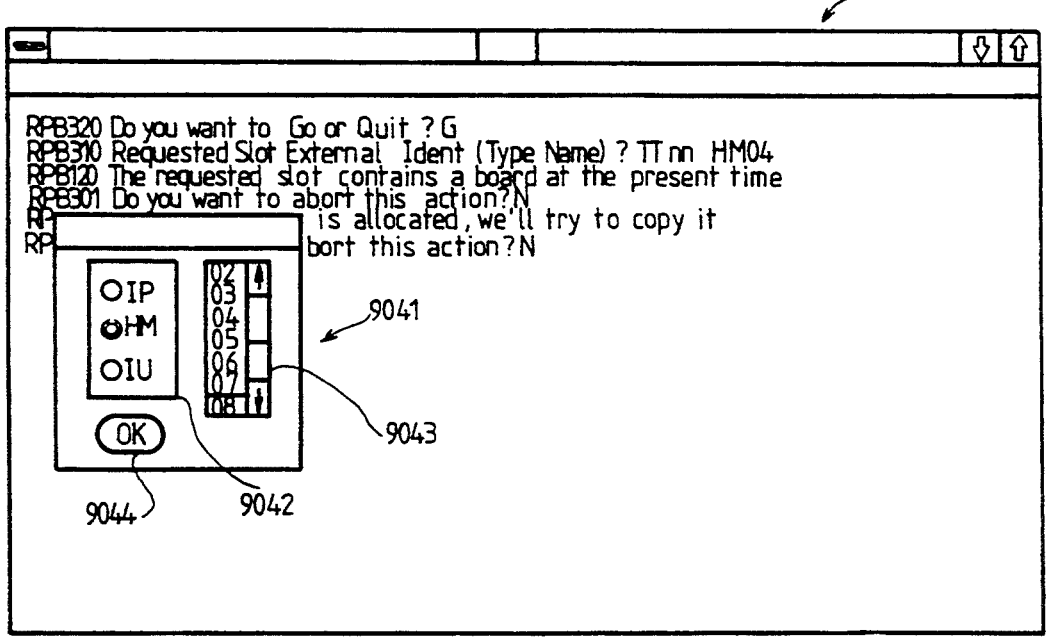
Figure 13A:
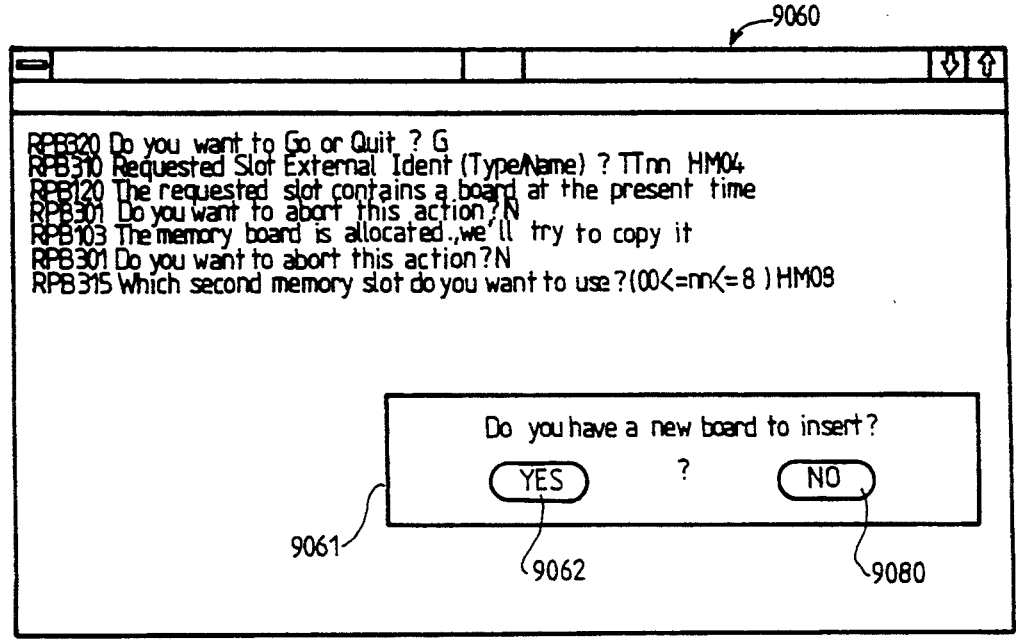
Figure 13B:
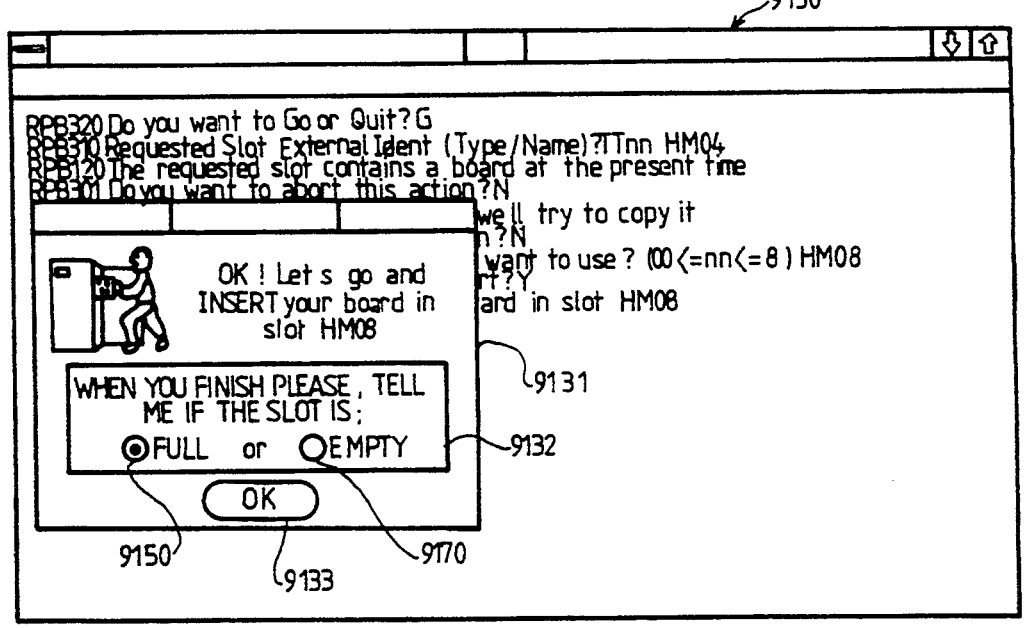
Figure 14:
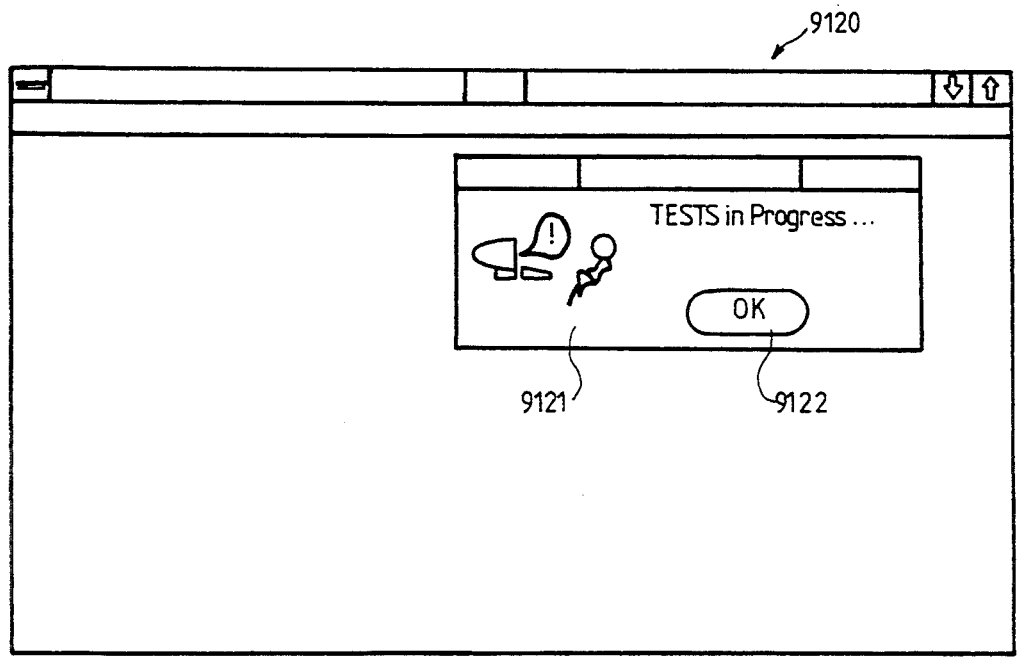
Figure 15A:
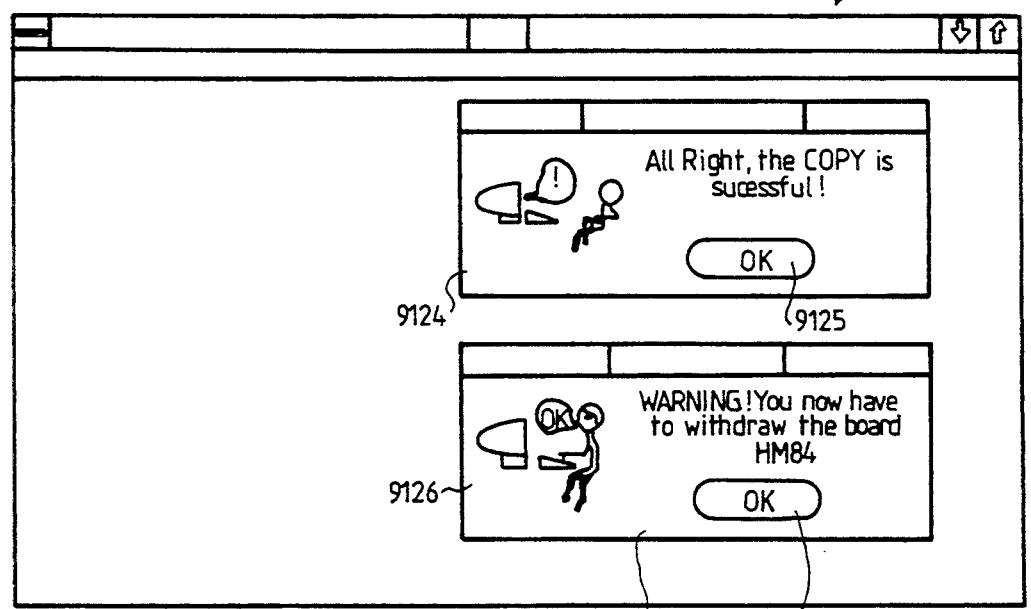
Figure 15B:
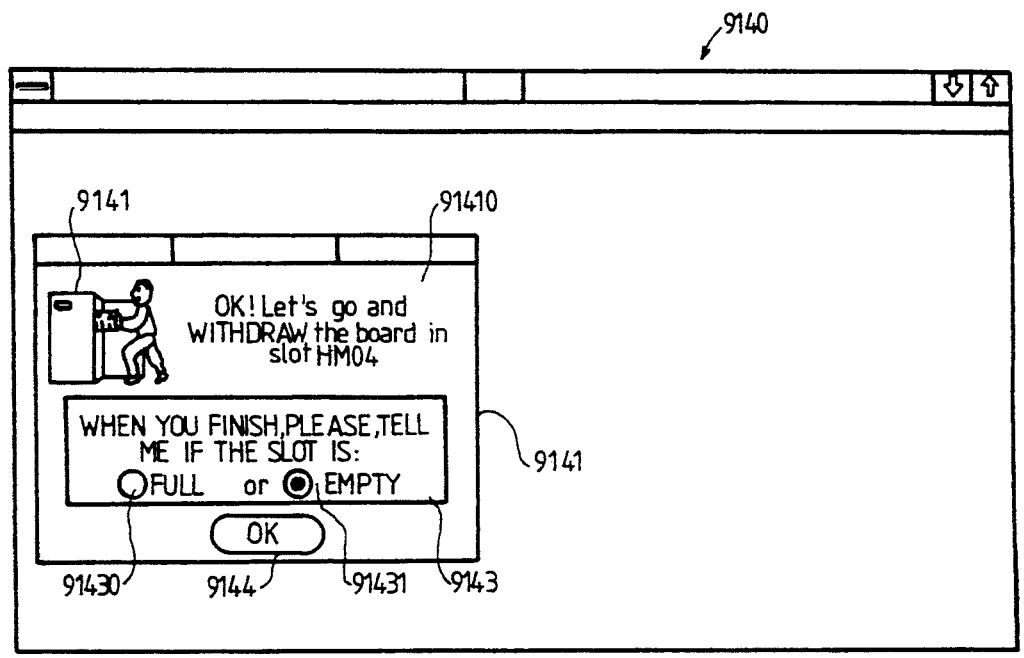
Figure 16:
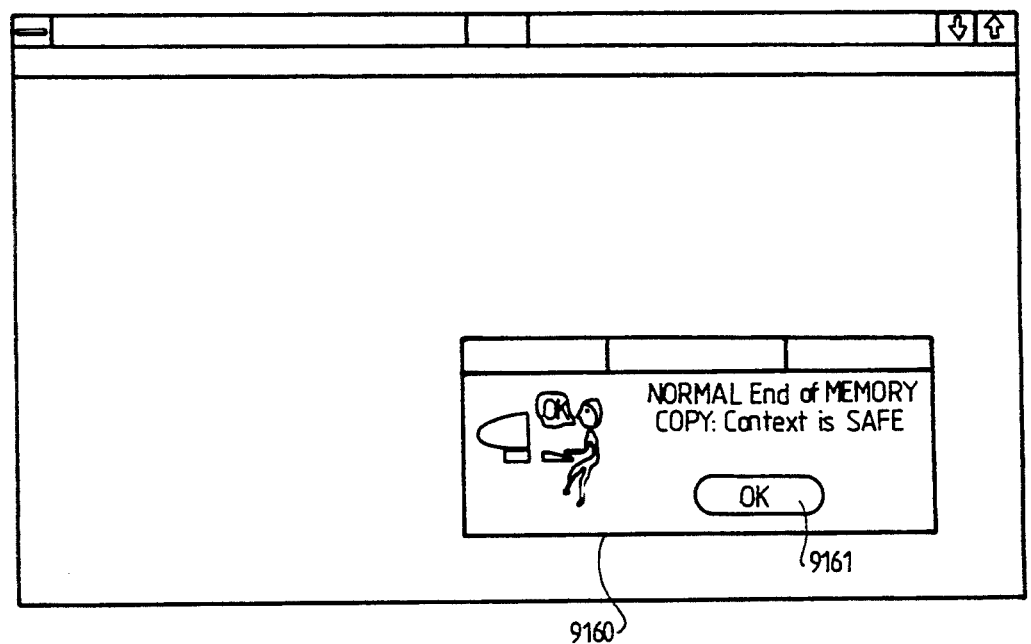

FIG. 12 can also be replaced by a presentation of the type of FIG. 20, with a message in the message box asking for an indication of which slot should be used to copy the memory.

Further modifications within the competence of one skilled in the art may be made without departing from the spirit and scope of the invention.

What is claimed is:

1. A method for the replacement of board elements in a system by a user, wherein the system includes a plurality of board elements and corresponding board slots and a board replacing service program which includes a presentation application for use in communicating with the user via a display device, comprising the steps of:

displaying to the user, in a dialog box, the identity of a group of board elements disposed each in a slot to be selected;

selecting by the user the identity of the group of board elements by validating the identity via an input means which interacts with said display device;

selecting from the group of board elements a first board element to be replaced by highlighting the selected first board element; and validating the selection on said display device with the input means.

2. The method according to claim 1, wherein the presentation application further comprises the steps of:

displaying, in a dialog box, a message indicating that the slot corresponding to the selected first board element is occupied;

displaying that the system will attempt to copy its contents;

displaying a question requesting the confirmation or cancellation of the service program; and selecting by the user the confirmation or cancellation of the service program by use of the input means.

3. The method according to claim 2, further including the steps of:

displaying, in a dialog box, the group of board elements in which a second slot can be selected by highlighting the second slot;

validating the selection by use of the input means; and checking by the service application that the slot is empty.

4. The method according to claim 3, wherein the presentation application further comprises the steps of:

requesting confirmation of a request for insertion of a new board element;

indicating, in a dialog box, to the user that the insertion of the board can be performed; and requesting to the user confirmation or cancellation of the board replacement by use of the input means to indicate that the second slot is full or empty.

5. The method according to claim 4, and further comprising the step of inserting a new board in the second slot wherein the presentation application comprises the steps of:

displaying, in a dialog box, information which indicates the execution of the test on the new board inserted in the second slot;

testing the new board by checking if the new board is valid in that the board is compatible with the first board element, copying the information which was contained in the first board element on the new board and displaying information which indicates the success of the copying, and an authorization to withdraw the board element from the first slot; and in a second dialog box, asking the user for confirmation or cancellation of the withdrawal of the board element, by clicking on a zone to indicate the first slot is empty or occupied.

* * * * *